United States Patent
Hjelm et al.

(10) Patent No.: US 8,472,388 B2
(45) Date of Patent: Jun. 25, 2013

(54) GATEWAY APPARATUS, AUTHENTICATION SERVER, CONTROL METHOD THEREOF AND COMPUTER PROGRAM

(75) Inventors: Johan Hjelm, Tokyo (JP); Takeshi Matsumura, Kawasaki (JP); Shingo Murakami, Kanagawa (JP); Toshikane Oda, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 13/122,871

(22) PCT Filed: Oct. 10, 2008

(86) PCT No.: PCT/JP2008/068908
§ 371 (c)(1),
(2), (4) Date: Apr. 6, 2011

(87) PCT Pub. No.: WO2010/041347
PCT Pub. Date: Apr. 15, 2010

(65) Prior Publication Data
US 2011/0188508 A1     Aug. 4, 2011

(51) Int. Cl.
*H04Q 7/00*     (2006.01)
*H04L 12/28*    (2006.01)

(52) U.S. Cl.
USPC ........................... 370/328; 370/401

(58) Field of Classification Search
USPC ................. 370/254, 255, 328, 338, 389, 401
See application file for complete search history.

(56) References Cited

U.S. PATENT DOCUMENTS

| | | | |
|---|---|---|---|
| 2003/0110374 A1* | 6/2003 | Yamamoto et al. | 713/155 |
| 2005/0287990 A1* | 12/2005 | Mononen et al. | 455/411 |
| 2006/0196931 A1* | 9/2006 | Holtmanns et al. | 235/380 |
| 2006/0280305 A1* | 12/2006 | Bajko et al. | 380/270 |

FOREIGN PATENT DOCUMENTS

| | | |
|---|---|---|
| JP | 2007233803 A | 9/2007 |
| JP | 2008083859 A | 4/2008 |
| WO | 2007/015075 A1 | 2/2007 |

OTHER PUBLICATIONS

Goeman, S. "D6.3: User Administration and Identity Management Technologies, Architectures and Components." ITEA Project 04012, LOMS—Local Mobile Services, Jul. 2008.

* cited by examiner

*Primary Examiner* — Hong Cho
(74) *Attorney, Agent, or Firm* — Coats & Bennett, P.L.L.C.

(57) ABSTRACT

One aspect of the present invention will provide a gateway apparatus being able to communicate with a user terminal and provide the user terminal with a GBA authentication between the gateway apparatus and an authentication server, comprising, a receiving unit operable to receive a HTTP request addressed to a network address of the gateway apparatus from the user terminal, a requesting unit operable to request an GBA authentication to the authentication server according to the reception of the HTTP request, and a transmission unit operable to transmit the HTTP request, after the GBA authentication, to the authentication server using a network address of the authentication server preliminarily received from the authentication server.

14 Claims, 11 Drawing Sheets

| BTID | IMPI | OpenID Identifier | OpenID Authentication Proxy address |
|---|---|---|---|
| . . | . . | . . | . . |
| Btid1 | Impi1 | http://imsop.net/Smith | http://150.236.132.154.8080 |
| Btid2 | Impi2 | http://imsop.net/Martin | http://150.236.132.66.6000 |
| . . | . . | . . | . . |

601 — BTID
602 — IMPI
603 — OpenID Identifier
604 — OpenID Authentication Proxy address
323

GATEWAY APPARATUS, AUTHENTICATION SERVER, CONTROL METHOD THEREOF AND COMPUTER PROGRAM

TECHNICAL FIELD

The present invention relates to a gateway apparatus, an authentication server, control method thereof and a computer program.

BACKGROUND

An OpenID is a shared identity service, which allows Internet users to log on to many different web sites using a single digital identity, eliminating the need for a different user name and password for each site. When using OpenID-enabled sites, users do not need to remember traditional authentication credentials such as username and password that are usually different for each web site. Instead, users only need to be registered with an OpenID "Identity Provider" (IdP), from which user is assigned a unique identity in the form of HTTP URL. Using only the identity, user can sign in every OpenID-enabled site.

There are three terms among others defined in OpenID standard that are particularly relevant to the present invention:

Identifier: A unique HTTP URL assigned to a user by IdP, for example, http://example.com/Smith.

Consumer: An Internet service provider that allows a user to use an OpenID Identifier to sign in its web site and requires a proof that the user owns the claimed Identifier.

IdP: Identity Provider that assigns an Identifier to a user and authenticates a user on behalf of the Consumers.

Figure 1A:
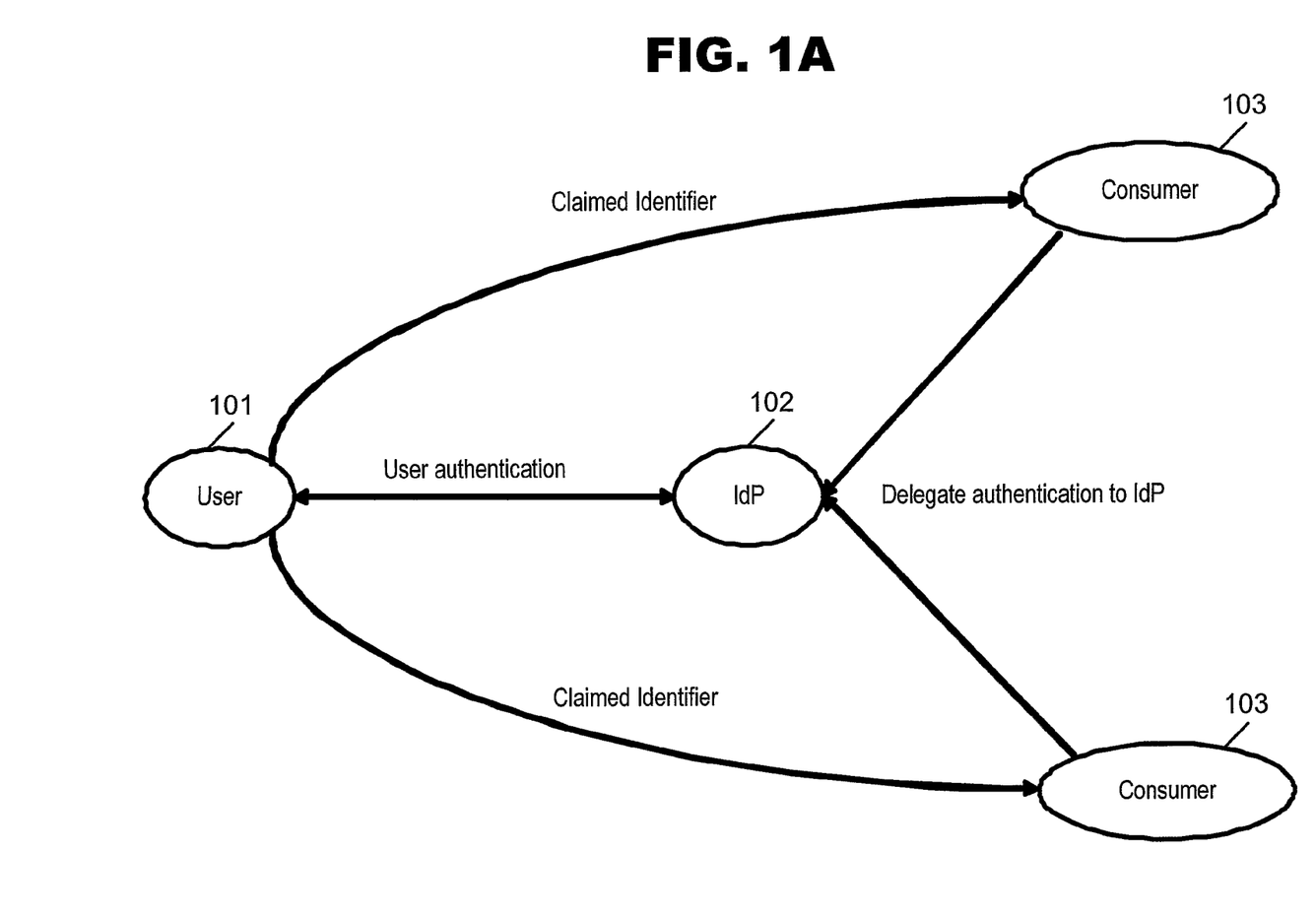
FIG. 1A shows a high-level relationship between entities in OpenID architecture.

FIG. 1A shows a high-level relationship between entities in OpenID architecture. A user 101 claims her Identifier to a sign in Consumer (=Internet service provider) 103. The Consumer 103 delegate authentication of the user 101 with the corresponding IdP 102, by using the received Identifier. The IdP 102 authenticates the user 101 on behalf of the Consumer 103. By doing so, as similar to Liberty Alliance, single sign-on is possible as Consumer 103 accepts OpenID Identifiers and delegate actual user authentication with IdP 102.

Figure 1B:
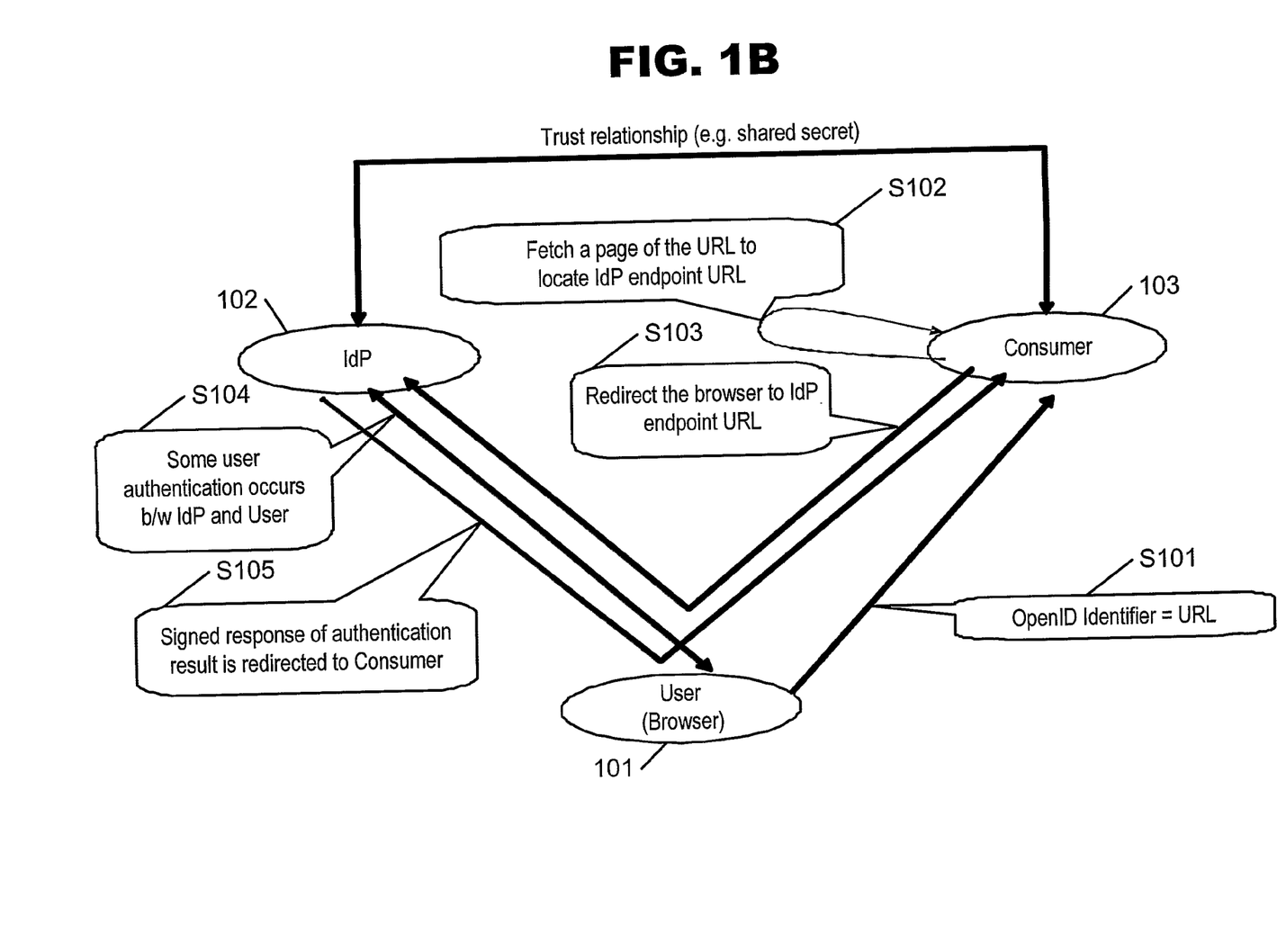
FIG. 1B shows a high-level flow of OpenID authentication.

FIG. 1B illustrates a high-level flow of OpenID authentication. Please note that it is assumed that there is a trust relationship between Consumer 103 and IdP 102 in that they agree on a shared secret so that exchanged messages between them through a user are verified in a secure way.

In step S101, a user of web browser connects to a Consumer web site and enters her OpenID Identifier, for example, "http://example.com/Smith" in an input form.

In step S102, the Consumer 103 fetches a web page designated by the URL according to the OpenID Identifier. The web page contains a link reference tagged by "openid.server" that points to the corresponding IdP endpoint URL. For instance, <link rel="openid.server" href=" http://example-.com/openid-auth"/> is provided in an HTML <header> of the fetched web page where "http://example.com/openid-auth" represents an IdP endpoint URL.

In step S103, the Consumer 103 redirects the browser to that IdP endpoint URL. In step S104, some authentication session starts between the IdP 102 and the browser in a user terminal used by the user 101, for instance the IdP 102 sends a password input form to the browser. Note that OpenID standard does not specify how the user 101 is authenticated by an IdP 102 but an IdP 102 can choose a preferred authentication method.

In step S105, after successful user authentication, the browser is again redirected to the original Consumer 103. The redirecting request contains an authentication result signed by the IdP 102. The Consumer 103 verifies this to know the user has been successfully authenticated.

OpenID is increasingly gaining adoption among large sites, with organizations acting as OpenID IdPs.

It will become a common practice for telecom operators to offer an OpenID IdP service to their subscribers so that their subscribers can obtain an additional user identity, an OpenID Identifier, which is usable in the Internet domain besides traditional telecom identities like MSISDN (Mobile Subscriber ISDN Number) and IMPU (IMS Public User Identity).

Comparing to existing OpenID IdP services provided by Internet service providers that rely on password-based user authentication toward those IdPs, one possible advantage of an OpenID IdP operated by telecom operators is more secure user authentication mechanism based on a SIM credential, for instance, by means of GBA (Generic Bootstrap Architecture) which is defined in 3GPP TS 33.22-V7.3.0 (2006-03), "Generic Authentication Architecture; Generic Bootstrap Architecture". In this case, the telecom operator has a table to associate subscriber's authentication identity such as IMS Private Identity (IMPI) associated with an OpenID Identifier, which may be stored in a Home Subscriber Server (HSS).

Figure 1C:
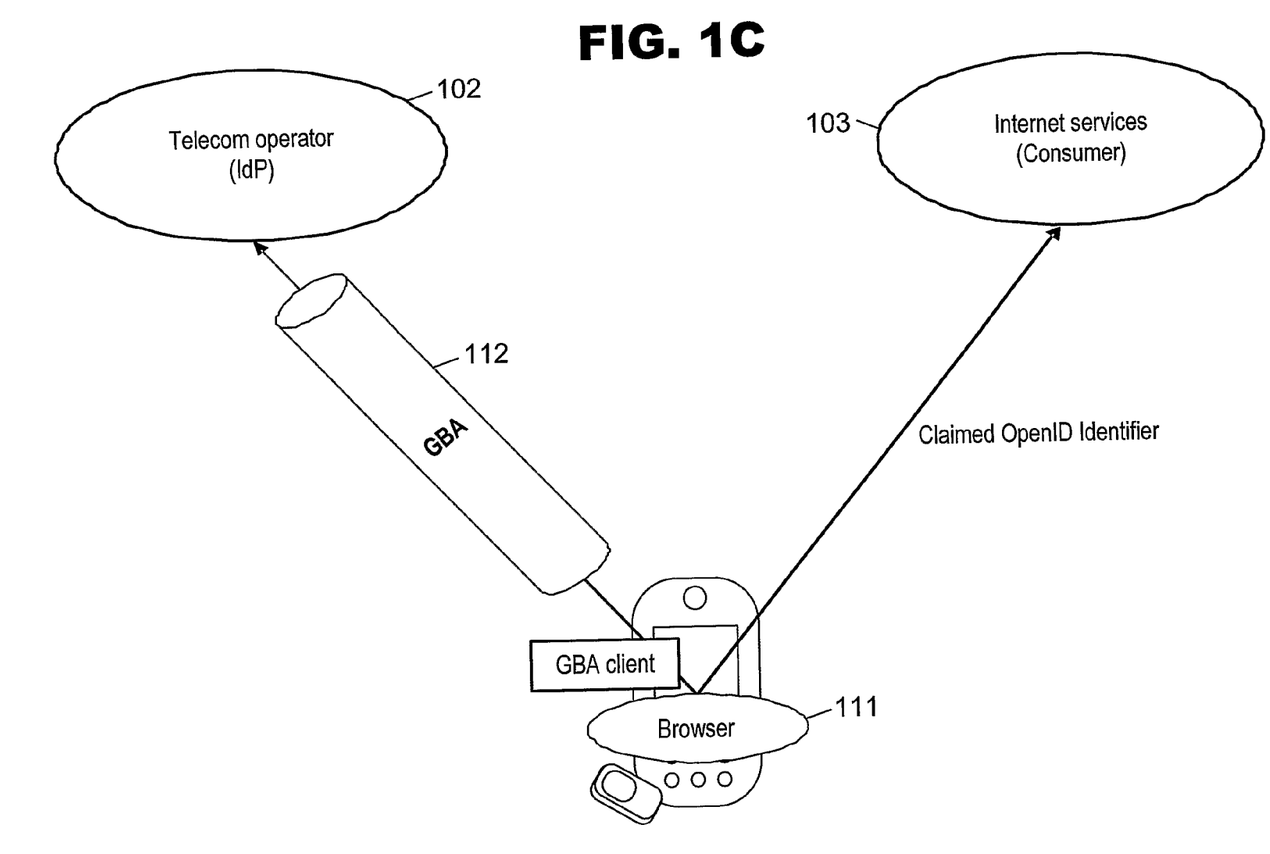
FIG. 1C shows a mechanism in which a mobile handset 111 establishes a GBA-authenticated HTTP session 112.

FIG. 1C depicts a mechanism in which a mobile handset 111 establishes a GBA-authenticated HTTP session 112 (by means of HTTP Digest and/or TLS as specified in 3GPP TS 24.109 V7.3.0 (2006-06), "Bootstrapping interface (Ub) and network application function interface (Ua), Protocol details") when the mobile handset 111 is redirected to the IdP 102 by the Consumer 103. Since this GBA authentication 112 can be performed silently without any user interaction involved, the user does not need to even remember and enter a password corresponding to her OpenID Identifier given by the operator 102.

A network architecture called "IP Multimedia Subsystem" (IMS) has been developed by the 3rd Generation Partnership Project (3GPP) as an open standard for handling multimedia services and sessions in the packet domain (for details regarding the IMS, please refer to http://www.3gpp.org/ftp/Specs/html-info/22173.htm). Various communication terminals and devices (hereinafter referred to as IMS terminals) that conform to the IMS standard are now known. A typical example of an IMS terminal is a mobile phone with IMS functionality. A personal computer (PC), a personal digital assistant (PDA), or the like can also serve as IMS terminals if they are equipped with IMS functionality. IMS terminals can provide multimedia services by, for example, receiving video streaming from a video-streaming server over an IMS network.

According to International Publication No. WO 2006/045706 which discloses a multimedia gateway called a "Home IMS Gateway" (HIGA), enabling non-IMS terminals which do not have an IMS functionality such as a desktop PC and a laptop PC to access services via the IMS network. The HIGA is located in a private network, to which at least one user terminal is connected. HIGA can be implemented on a "Set Top Box" (STB), a "Residential Gateway" (RGw) or different home devices.

It is desired to provide a system in which a user of user terminal connected to the HIGA can sign-in an Internet service using an OpenID Identifier while actual user authentication toward the IdP (=IMS operator) is performed via GBA based on a HIGA's ISIM credential.

SUMMARY

According to a first aspect of the invention, there is a provided gateway apparatus being able to communicate with a user terminal and provide the user terminal with a GBA authentication between the gateway apparatus and an authentication server, comprising, a receiving unit operable to receive a HTTP request addressed to a network address of the gateway apparatus from the user terminal, a requesting unit operable to request an GBA authentication to the authentication server according to the reception of the HTTP request, and a transmission unit operable to transmit the HTTP request, after the GBA authentication, to the authentication server using a network address of the authentication server preliminarily received from the authentication server.

According to a second aspect of the invention, there is provided an authentication server connected to a network for providing a subscriber authentication service for a service provider server, comprising, a receiving unit operable to receive a web page request for requesting a web page designated by an first identifier of a user to be authenticated, an obtaining unit operable to obtain a network address of the gateway apparatus corresponding to the first identifier, a transmission unit operable to transmit the web page containing the network address of the gateway apparatus to the service provider server, a GBA authentication unit operable to authenticate whether the gateway apparatus is the subscriber of a network operator relating to the authentication server, wherein the receiving unit further operable to receive a HTTP request including the first identifier of the user to be authenticated from the gateway apparatus after the GBA authentication, the authentication server further comprising a verification unit operable to verify whether the first identifier received after the GBA authentication is identified with the one assigned to the gateway apparatus or not.

Further features of the present invention will become apparent from the following description of exemplary embodiments with reference to the attached drawings.

DETAILED DESCRIPTION

Embodiments of the present invention will now be described with reference to the attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are always indispensable for the present invention.

Figure 2:
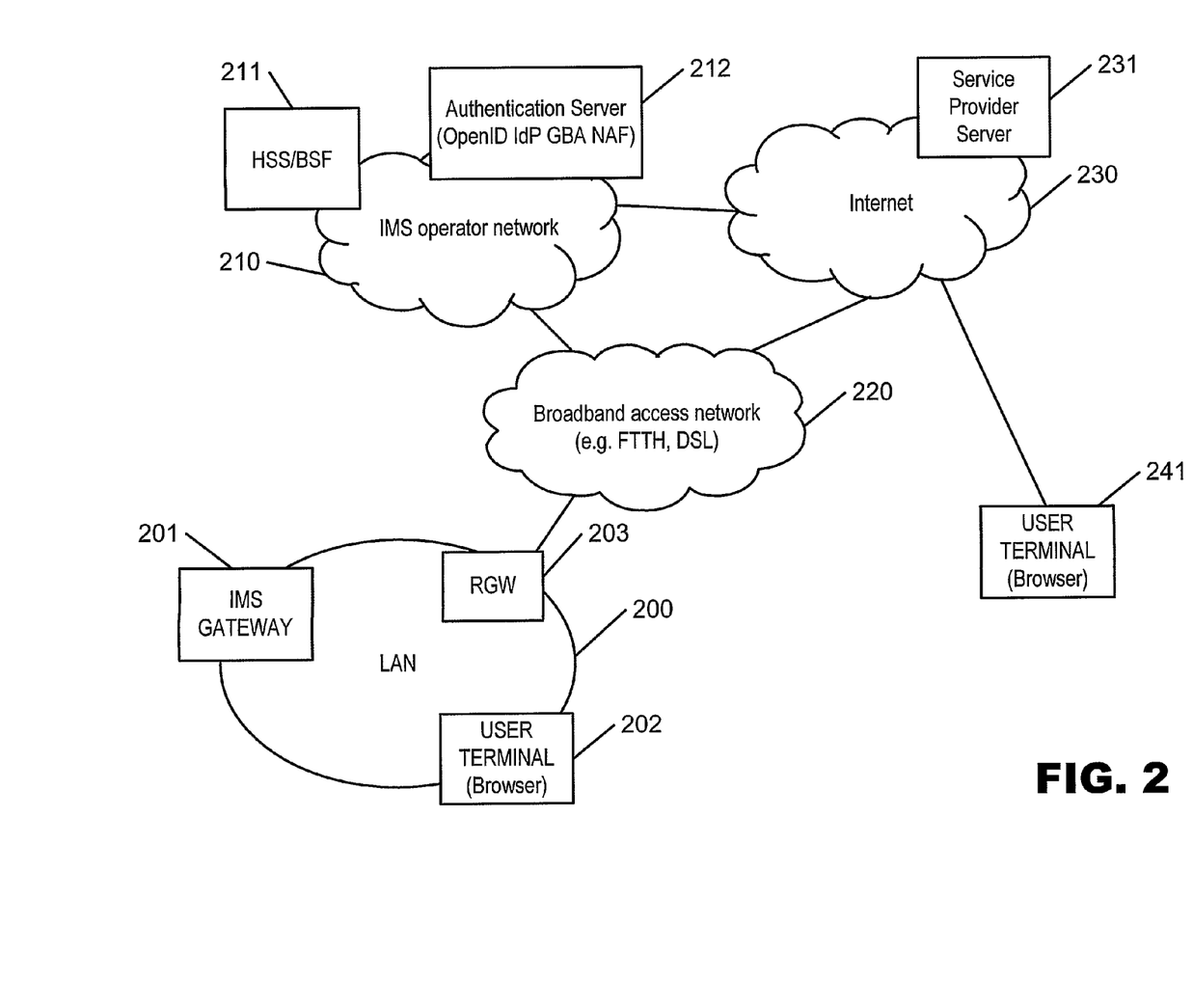
FIG. 2 shows an exemplary system according to one embodiment of the present invention.

FIG. 2 shows an exemplary system according to one embodiment of the present invention. In this system, IMS (IP Multimedia Subsystem) gateway (IMS GW) 201 and a user terminal (UT) 202 are communicatively coupled to a broadband access network 220 such as FFTH or DSL via residential gateway (RGW) 203, respectively. The IMS gateway 201, the user terminal 202 and the RGW 203 are communicatively coupled each other via a local area network (LAN) 200. The user terminal 202 can also be communicatively coupled to an IMS operator network 210 using the IMS gateway 201.

IMS gateway 201 includes a function of OpenID Authentication Proxy to provide GBA authentication between the IMS gateway 201 and the authentication server 212 for the user terminal 202. The IMS gateway 201 may include a function corresponding to the residential gateway 203. IMS gateway 201 may work as the Home IMS Gateway (HIGA) located in the LAN 200 as a private network.

The user terminal 202 may be a general purpose computer such as, a desktop computer, laptop computer, personal digital assistance (PDA), smart phone, or mobile terminal/telephone. When the user terminal 202 communicates with other UTs over the radio communication link, the communication link may accord to a radio communication protocol such as ANSI-136, GSM (Global Standard for Mobile) communication, GPRS (General Packet Radio Service), EDGE (Enhanced Data Rates for GSM Evolution), Code Division Multiple Access (CDMA), Wideband Code Division Multiple Access (WCDMA), CDMA2000, Long Term Evolution (LTE) and UMTS (Universal Mobile Telecommunications System).

The residential gateway 203 is a gateway apparatus to enable communication between the IMS gateway 201 and the user terminal, and external servers on an external network 210, 220, or 230.

IMS operator network 210 includes a home subscriber server/bootstrap server function (HSS/BSF) 211 and an authentication server (OpenID IdP GBA NAF) 212.

The HSS/BSF 212 includes a master user database containing subscription-related information (user profiles). HSS/BSF212 provides application independent function for mutual authentication between the user terminal 202 and the HSS/BSF 212 based on 3GPP protocol AKA (Authentication and Key Agreement).

The authentication server 212 provides authentication services according to the embodiment of the present application. The IMS operator may have or operate the authentication server 212.

IMS operator network 210 may includes further entities for communication, for example, an IMS application server (AS), and a Call Session Control Function (CSCF) including a Proxy CSCF (P-CSCF), an Interrogating CSCF (I-CSCF) and a Serving CSCF (S-CSCF), etc.

A service provider server 231 is connected to the Internet 230 to provide a certain application to the user terminal 202 and allow a user to use an OpenID Identifier to sign in its web site and requires a proof that the user owns the claimed Identifier.

A user terminal 241 is connected to the Internet 230 and can communicate with the IMS gateway 201 via the network. The user terminal 241 may be configured corresponding to the user terminal 202 and be a general purpose computer such as, a desktop computer, laptop computer, personal digital assistance (PDA), smart phone, or mobile terminal.

Figure 3A:
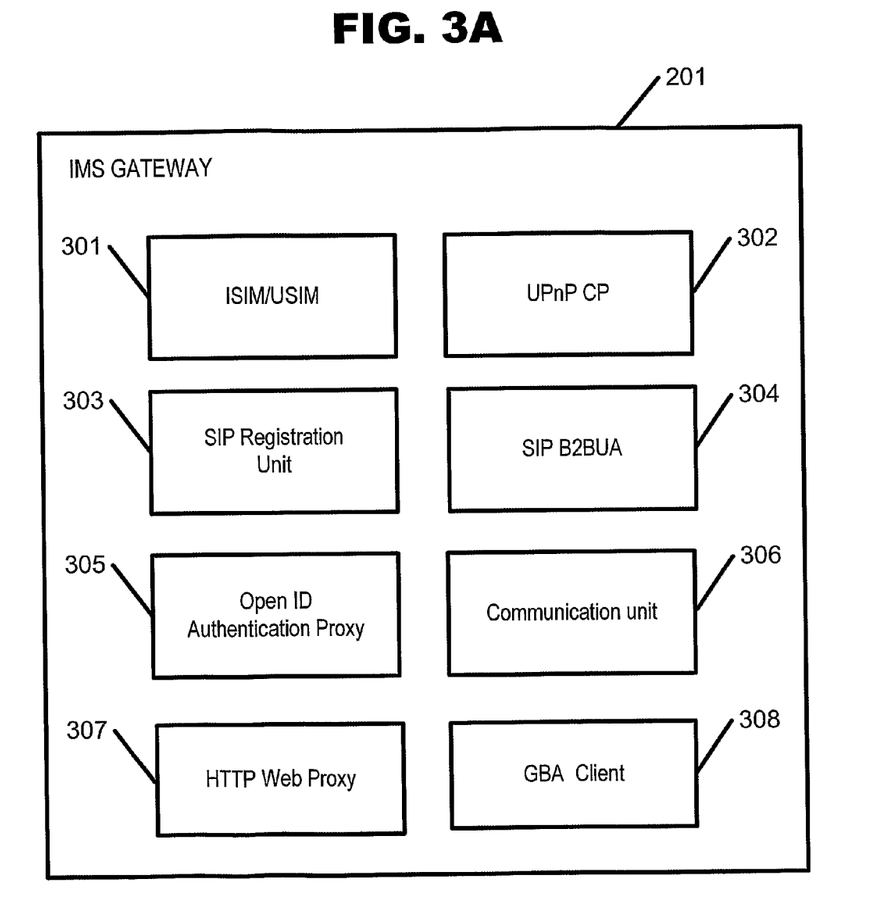
FIG. 3A shows an exemplary IMS gateway 201 according to one aspect of embodiments of the present invention.

FIG. 3A shows an exemplary IMS gateway 201 according to the embodiment of the present invention. The exemplary IMS gateway 201 includes a ISIM/USIM 301, an UPnP Control Point (CP) 302, a SIP registration unit 303, a SIP Back-to-Back User Agent (B2BUA) 304, an OpenID authentication proxy 305, a communication unit 306, a HTTP web proxy 307 and a GBA client 308.

In FIG. 3A, the ISIM/USIM 301 stores essential information for each IMS gateway to work as an IMS client, such as shared secret for the authentication and IMS public identity (IMPU). The UPnP CP 302 performs the device discovery and controls the discovered devices. UPnP CP 302 includes UPnP IGD (Internet Gateway Device) to create a port mapping on the residential gateway 203.

The SIP Registration unit 303 accepts a registration of SIP devices in the residential network and manages the registration. The SIP B2BUA 304 performs the conversion between IETF SIP and IMS SIP so that a device connected to the IMS gateway that is not IMS-enabled can access the IMS operator network 210.

The OpenID authentication proxy 305 is an application within the IMS gateway 201 that proxies the OpenID user authentication procedure between browser and OpenID IdP. The OpenID Authentication Proxy 305 is authenticated to OpenID IdP by means of GBA as the IdP is acting as NAF.

The communication unit 306 is an interface to communicatively couple to the LAN 200 (which is UPnP-based and/or SIP-based) to communicate with the user terminal, the authentication server 212 and the service provider server 231.

The HTTP web proxy 307 is a HTTP server function that receives HTTP requests from browsers and forwards the requests to other HTTP servers specified by request-URL of the requests. Once an address of the HTTP web proxy is configured in the browsers, all HTTP traffics sent from/to the browsers traverse the HTTP web proxy.

The GBA client 308 is a function in the IMS gateway 201 executing the bootstrapping procedure with BSF (i.e. supporting Ub reference point) and providing applications within the IMS gateway 201 (such as OpenID Authentication Proxy 305) with security association so that the applications can communicate with GBA NAF 325 in a secure and authenticated manner (i.e. supporting Ua reference point).

Figure 3B:
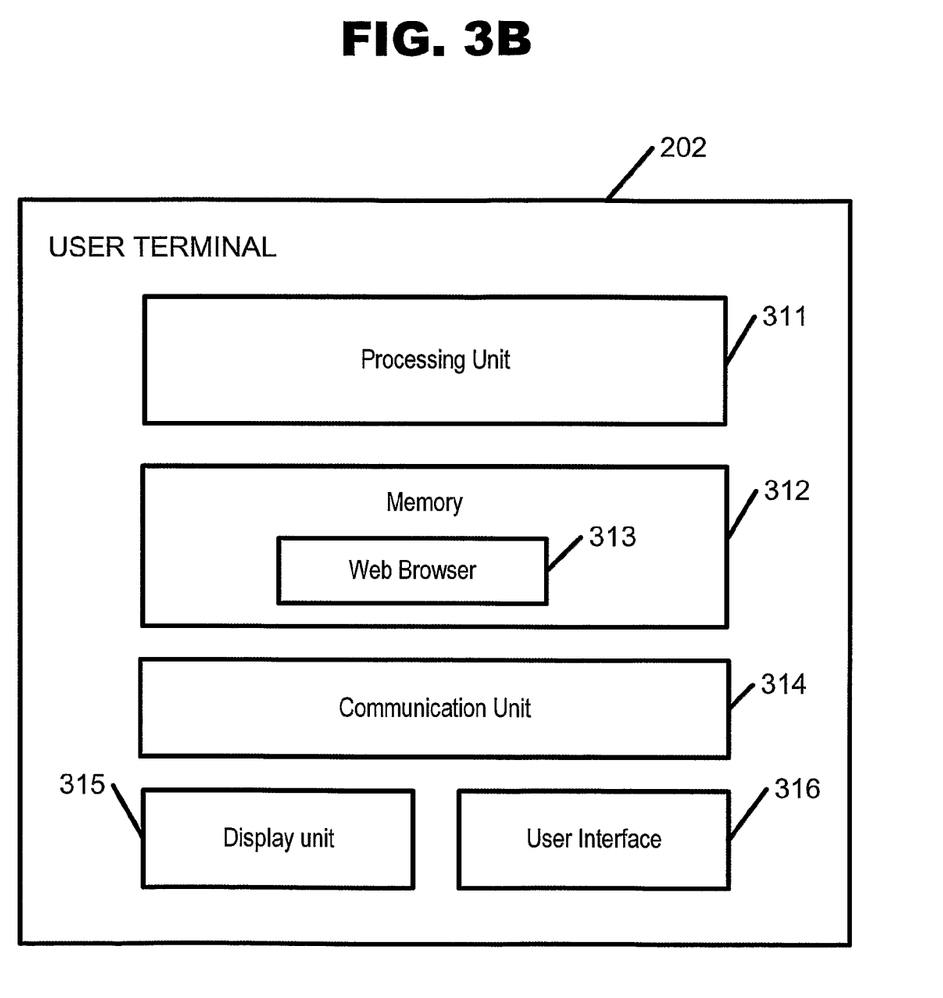
FIG. 3B shows an exemplary user terminal 202 according to one aspect of embodiments of the present invention.

FIG. 3B shows an exemplary user terminal 202 according to the embodiment of the present invention. The exemplary user terminal 202 includes a processing unit 311, a memory 312 including web browser application program 313, a communication unit 314, a display unit 315 and a user interface 316.

The processing unit 311 executes processing necessary for controlling the user terminal 202. The processing unit also executes web browser application program 313 in the memory 312. The memory 312 stores program to be executed by the processing unit 311 and application program and data to be used in the user terminal 202.

The communication unit 314 transmits and receives information including a HTTP request. The display unit 315 displays information including a web browser window on a display device, for example LCD, PDP or CRT. The user interface 316 is a interface for a user to input instructions, for example a mouse and keyboards.

Figure 3C:
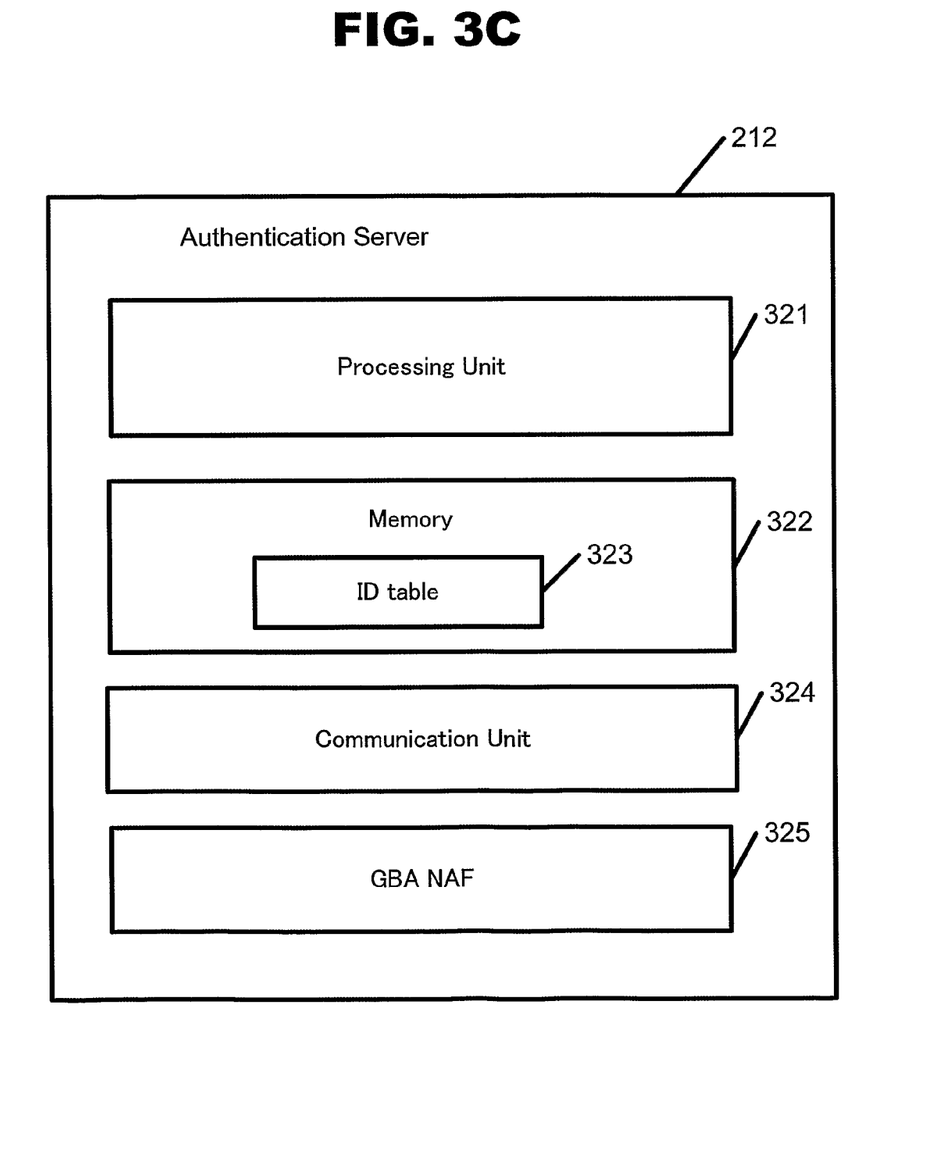
FIG. 3C shows an exemplary authentication server 212 according to one aspect of embodiments of the present invention.

FIG. 3C shows an exemplary authentication server 212 according to the embodiment of the present invention. The exemplary authentication server 212 includes a processing unit 321, a memory 322 including an ID table 323, a communication unit 324, a GBA NAF (Generic Bootstrapping Architecture Network Application Function) 325.

The processing unit 321 executes processing necessary for controlling the authentication server 212. The memory 322 stores program to be executed by the processing unit 321 and application program and data to be used in the authentication server 212. The ID table 323 will be described with reference to FIG. 6. The communication unit 324 transmits and receives information to communicate with the IMS gateway 201, the HSS/BSF 211 or the service provider server 231.

The GBA NAF 325 is a function in the authentication server 212 executing the GBA authentication procedure with the OpenID authentication proxy 305 of the IMS gateway 201.

In FIGS. 3A through 3C, each module may be implemented as an independent hardware module which executing corresponding processing program to achieve desired functions, or a software module including corresponding process codes executed in a processor, such as CPU, MPU, VGA, FPGA, ASIC or DSP.

Figure 4:
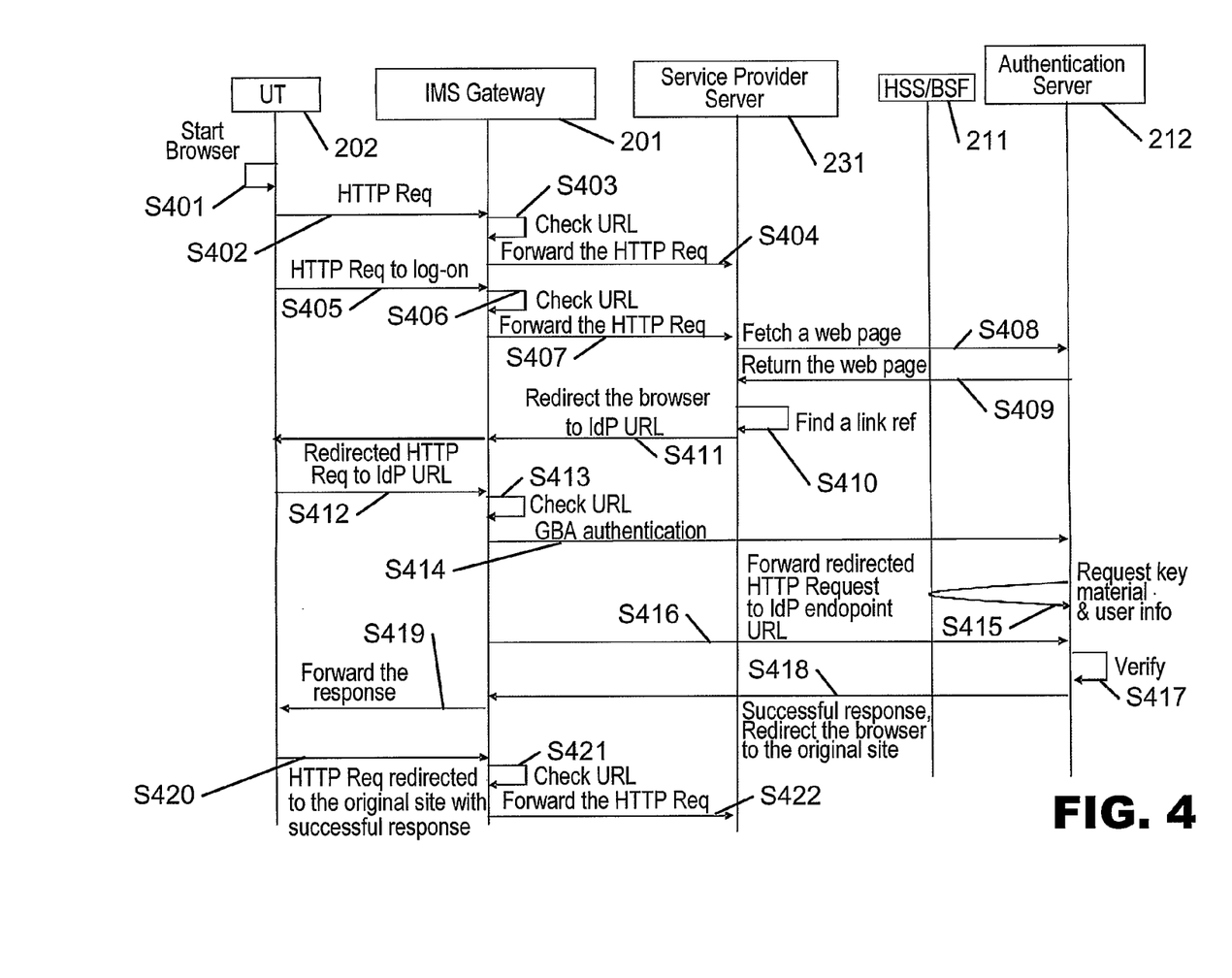
FIG. 4 shows an exemplary sequence diagram describing how a user of the web browser at home is authenticated when accessing an Internet service that allows the OpenID-based authentication, according to one aspect of the present application.

FIG. 4 shows an exemplary sequence diagram describing how a user of the web browser at home is authenticated when accessing an Internet service that allows the OpenID-based authentication, according to one aspect of the present application.

In step S401, user starts up a web browser in the user terminal 202 by executing the web browser application program 313. In step S402, the user terminal 202 sends a HTTP request to an address of the HTTP web proxy 307 in the IMS gateway 201 according to a user instruction to the browser for a desired Internet service by clicking a bookmark or entering a URL on the web browser.

In step S403, the OpenID Authentication Proxy 305 of the IMS gateway 201 checks the destination URL to compare the URL to the IdP endpoint URL of the authentication server 212. In this case, the two URLs are not identical. In step S404, the HTTP web proxy 307 forwards the HTTP request to the destination URL. Though it is not shown in FIG. 4, a corresponding HTTP response to the request is also proxied by the HTTP web proxy 307.

In step S405, after several exchanges of HTTP requests and responses between the user terminal 202 and the service provider server 231, now the user is presented a login form. The user enters her/his OpenID Identifier (e.g. http://imsop.net/Smith). The HTTP request containing the OpenID Identifier is sent to the HTTP web proxy 307 of the IMS gateway 201.

In step S406, the OpenID Authentication proxy 305 checks the destination URL to compare that URL to the IdP endpoint URL of the authentication server 212. In this case, the two URLs are not identical.

In step S407, the HTTP web proxy 307 forwards the HTTP request to the destination URL. In step S408, the service provider server 231 sends a HTTP GET to fetch a web page located at http://imsop.net/Smith. In step S409, responding to the HTTP GET, the authentication server 212 returns a web page containing a link reference URL of the IdP endpoint URL of the authentication server 212 tagged by openid.server in a HTML header part. For example, the link reference looks like:<link ref="openid.server" href="IdP endpoint URL">

In step S410, the service provider server 231 obtains an IdP endpoint URL from the link reference. In step S411, the service provider server 231 redirects the browser in the user terminal through the HTTP web proxy 307 of the IMS gateway 201 to the IdP endpoint URL with the claimed OpenID Identifier.

In step S412, the browser sends the redirected HTTP request addressed to the IdP endpoint URL to the HTTP web proxy 307 of the IMS gateway 201. In step S413, the OpenID Authentication Proxy 305 checks the destination URL to compare the URL to the IdP endpoint URL. In this case, the two URLs are identical. The OpenID Authentication Proxy 305 understands the HTTP request is an OpenID user authentication request.

In step S414, the OpenID Authentication Proxy 307 sends a GBA authentication request to authenticate itself. This request may be implemented together with processing in step S416 as HTTP digest authentication or implemented as a part of TLS handshake as specified in 3GPP TS 24.109 V7.3.0 (2006-06), "Bootstrapping interface (Ub) and network application function interface (Ua), Protocol details".

In step S415, the authentication server 212 fetches a GBA key material and user information from HSS/BSF 211 through GBA Zn interface. The user information includes the IMPI of the IMS gateway 201. Using the key material, the IdP as NAF authenticates the IMS gateway 201.

In step S416, after successful GBA authentication, the OpenID Authentication Proxy 305 forwards the HTTP request containing the claimed OpenID Identifier to the authentication server 212. In step S417, the authentication server 212 verifies if the claimed OpenID Identifier is owned by a GBA-authenticated user identified by an IMPI according to the fetched user information at step S415.

In step S418 and S419, if verified, the authentication server 212 redirects the browser (through the HTTP web proxy 307) with a signed authentication result (i.e. assertion) to the service provider server 231.

In step S420, the user terminal 202 sends the redirected HTTP request addressed to the service provider server 231 to the HTTP web proxy 307. In step S421, the OpenID Authentication Proxy 305 checks the destination URL to compare the URL to the IdP endpoint URL. In this case, the two URLs are not identical.

In step S422, the HTTP web proxy 307 forwards the HTTP request to the destination URL.

According to the above procedure, user of the web browser sitting home can use an OpenID Identifier given by the IMS operator (=authentication server 212) to logon to Internet services (=service provider server 231) without entering a password. The user authentication toward the authentication server 212 is silently accomplished in the backend with help from OpenID Authentication Proxy functionality in the IMS gateway 201 based on its ISIM credential.

However, in the above procedure, all HTTP requests from the web browser is sent to the HTTP web proxy 307 while only the HTTP request addressed to the authentication server 212 is of interest for the purpose of user authentication to the authentication server 212.

To this end, the OpenID Authentication Proxy 305 is required to check every destination URL of every HTTP request sent from the browser, which is costly for resource-limited consumer devices such as IMS gateway implemented in an ordinary residential gateway device.

In the following, a mechanism to address the abovementioned disadvantage will be provided. That mechanism allows service provider server 231 to redirect a web browser to the address of the OpenID Authentication Proxy 305 so that the redirected HTTP request sent from the browser is sent to the OpenID Authentication Proxy 305, not to the authentication server 212. The OpenID Authentication Proxy 305 then forwards the HTTP request while the IMS gateway 201 is authenticated through GBA. The mechanism does not require the user to manually configure a HTTP web proxy setting in the web browser because the IMS gateway 201 does not need to be a HTTP web proxy 307, and as the result, the HIGA does not need to proxy all HTTP requests/responses sent from/to the browser.

With the proposed mechanism, it is basically the IMS operator that acts as the authentication server 212. However, the mechanism also allows a 3rd party service providers that are trusted by the IMS operator to act as the authentication server 212 while the user authentication to the authentication server 212 is still via GBA based on ISIM credential.

The authentication server 212 assigns an OpenID Identifier to a subscriber, which is associated with a subscriber's authentication identity such as an IMPI. Optionally, the operator allows the user to determine a password for the Identifier so that the user can use the Identifier even outside home (i.e. without help from the IMS gateway 201).

When the IMS gateway 201 starts up, the IMS gateway informs the authentication server 212 of its OpenID Authentication Proxy address. This can be done by using HTTP-based protocol such as SOAP (http://www.w3.org/TR/soap/) or XCAP (IETF RFC4825, XCAP), while the protocol is protected by GBA, or SIP message such as Register or Publish can be used if the authentication server 212 implements ISC interface (3GPP TS 23.228 V6.6.0 (2004-06), "IP Multimedia Subsystem, Stage2").

Figure 5:
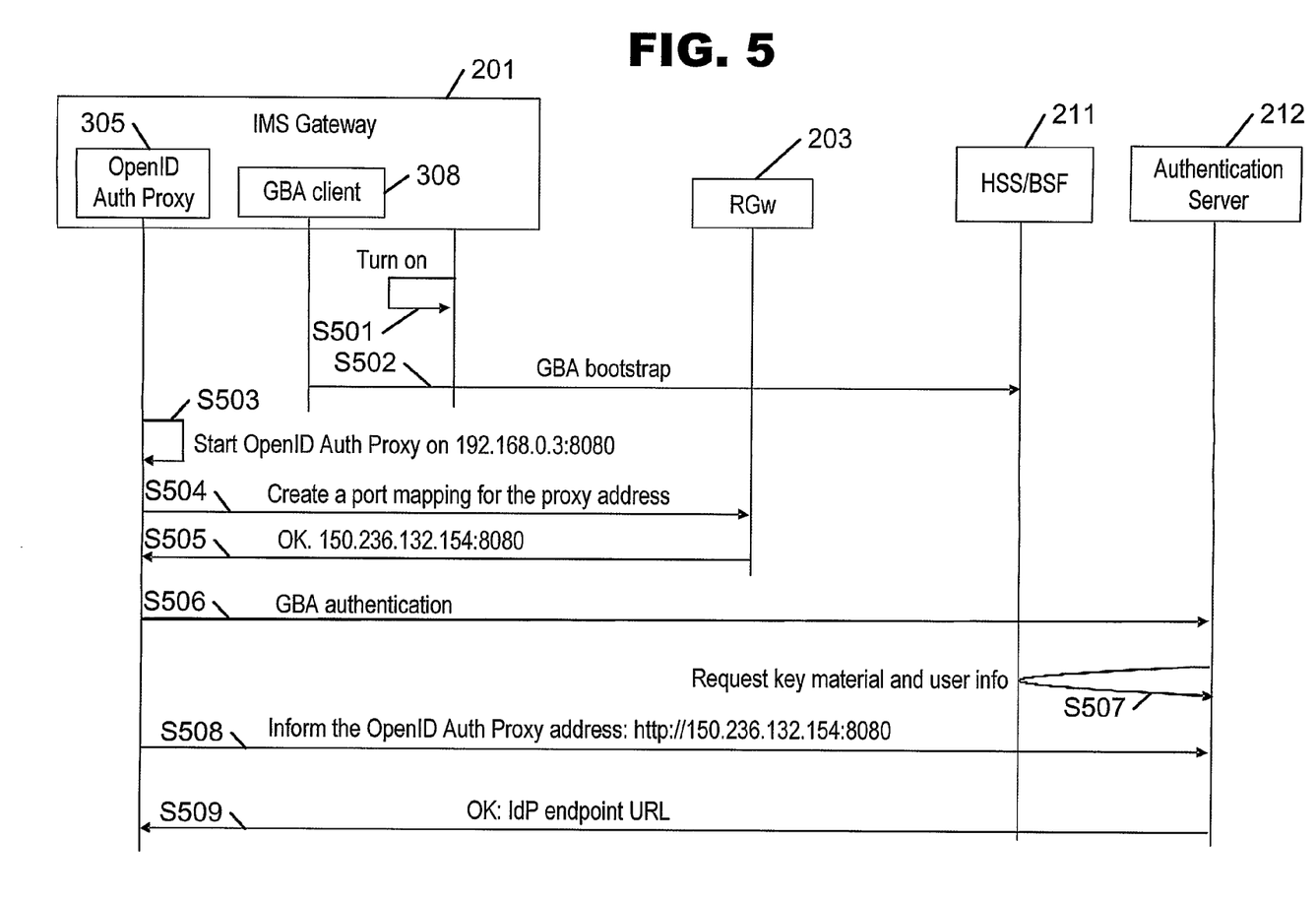
FIG. 5 shows an exemplary sequence diagram describing how the IMS gateway 201 and the authentication server 212 exchange their own address.

The OpenID Authentication Proxy address can be a global IP address of the residential gateway 203 (e.g. 150.236.132.154:8080), if the OpenID Authentication Proxy 305 supports the user away from home, or it can be a private IP address (e.g. 192.168.0.3:8080) if the OpenID Authentication Proxy 305 supports only the user at home. If the OpenID Authentication Proxy 305 address is global, the IMS gateway 201 creates a port mapping on the residential gateway using e.g. UPnP IGD (Internet Gateway Device). The procedure of this is exemplified in FIG. 5. FIG. 5 shows an exemplary sequence diagram describing how the IMS gateway 201 and the authentication server 212 exchange their own address.

In step S501, the IMS gateway 201 is turned on by the user. In step S502, the GBA client 308 in the IMS gateway 201 bootstraps with HSS/BSF 211. In step S503, the OpenID Authentication Proxy 305 in the IMS gateway 201 starts up at an address 192.168.0.3:8080.

In step S504, the OpenID Authentication Proxy 305 asks a residential gateway 203 using the UPnP IGD to create a port mapping between a WAN address and the private IP address. In step S505, the mapped address 150.236.132.154:8080 is returned from the residential gateway 203.

In step S506, the OpenID Authentication Proxy 305 sends a GBA authentication request to authenticate itself to the authentication server 212. This request may be implemented together with processing in step 508 as HTTP digest authentication or implemented as a part of TLS handshake as specified in 3GPP TS 24.109 V7.3.0 (2006-06), "Bootstrapping interface (Ub) and network application function interface (Ua), Protocol details".

In step S507, the authentication server 212 fetches a GBA key material and user information from HSS/BSF 211 through GBA Zn interface. The user information may include IMPI of the IMS gateway 201. Using the key material, the authentication server 212 as NAF authenticates the IMS gateway 201.

In step S508, after successful GBA authentication, the OpenID Authentication Proxy 305 informs the authentication server 212 of its address http://150.236.132.154:8080. The authentication server 212 stores the OpenID Authentication Proxy address in association with the user's OpenID Identifier in the ID table 323.

In step S509, in response to the reception of the OpenID Authentication Proxy address, the authentication server 212 returns of its address as an OpenID IdP endpoint URL (e.g. http://imsop.net/openid-auth) to the OpenID Authentication Proxy 305.

The procedure according to FIG. 5 is carried out whenever needed for instance when the IMS gateway 201 starts up, reboots, or the IP address that IMS gateway 201 uses has changed, etc.

Figure 6:
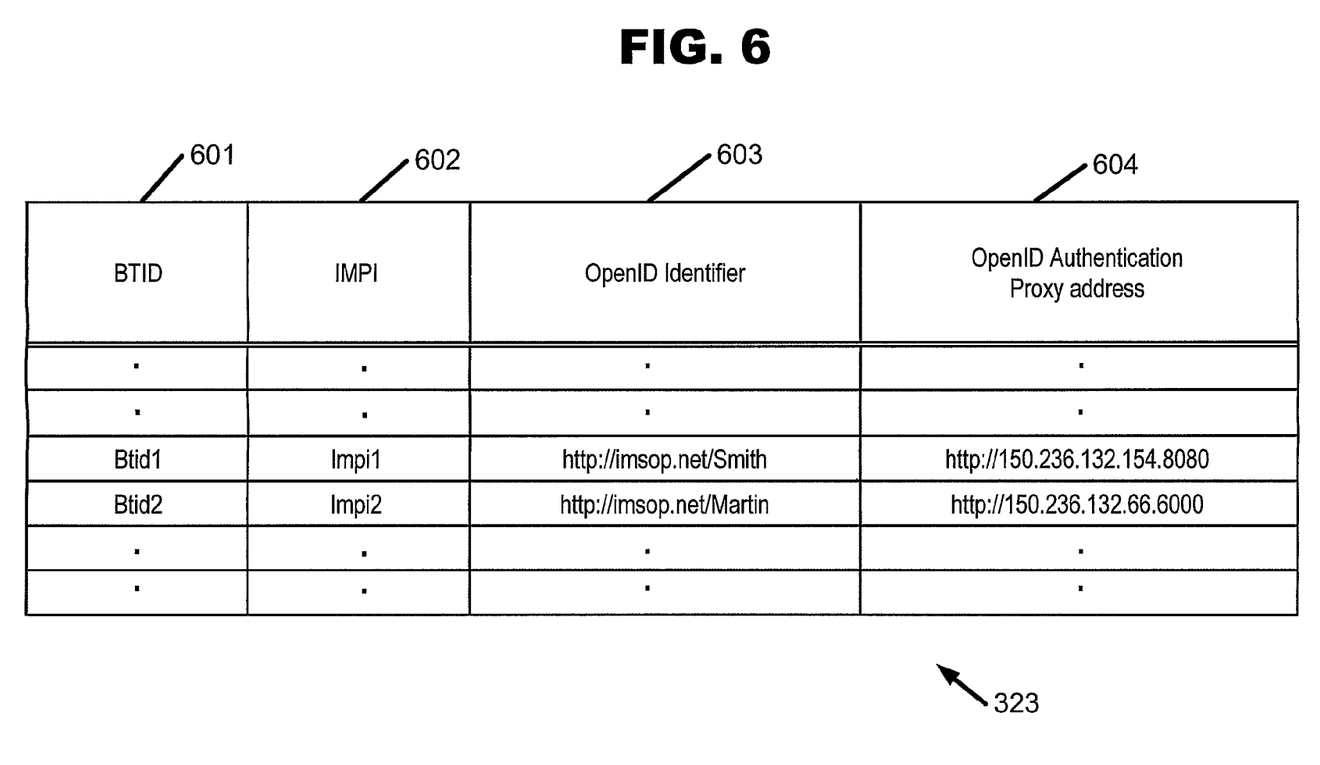
FIG. 6 shows an exemplary ID table 323 according to one aspect of embodiments of the present invention.

According to the preparation process described above, the authentication server 212 can create the ID table 323 as is shown in FIG. 6 storing a BTID (Bootstrap Transaction ID) 601, the IMPI 602 of the IMS gateway 201, the OpenID Identifier 603 of the user, and the OpenID Authentication Proxy address 604 assigned to the IMS gateway 201, associated with each other. The BTID 601 is used to identify the subscriber to be authenticated over GBA Ua reference point and to select the key material and user information stored in HSS/BSF 211.

Figure 7:
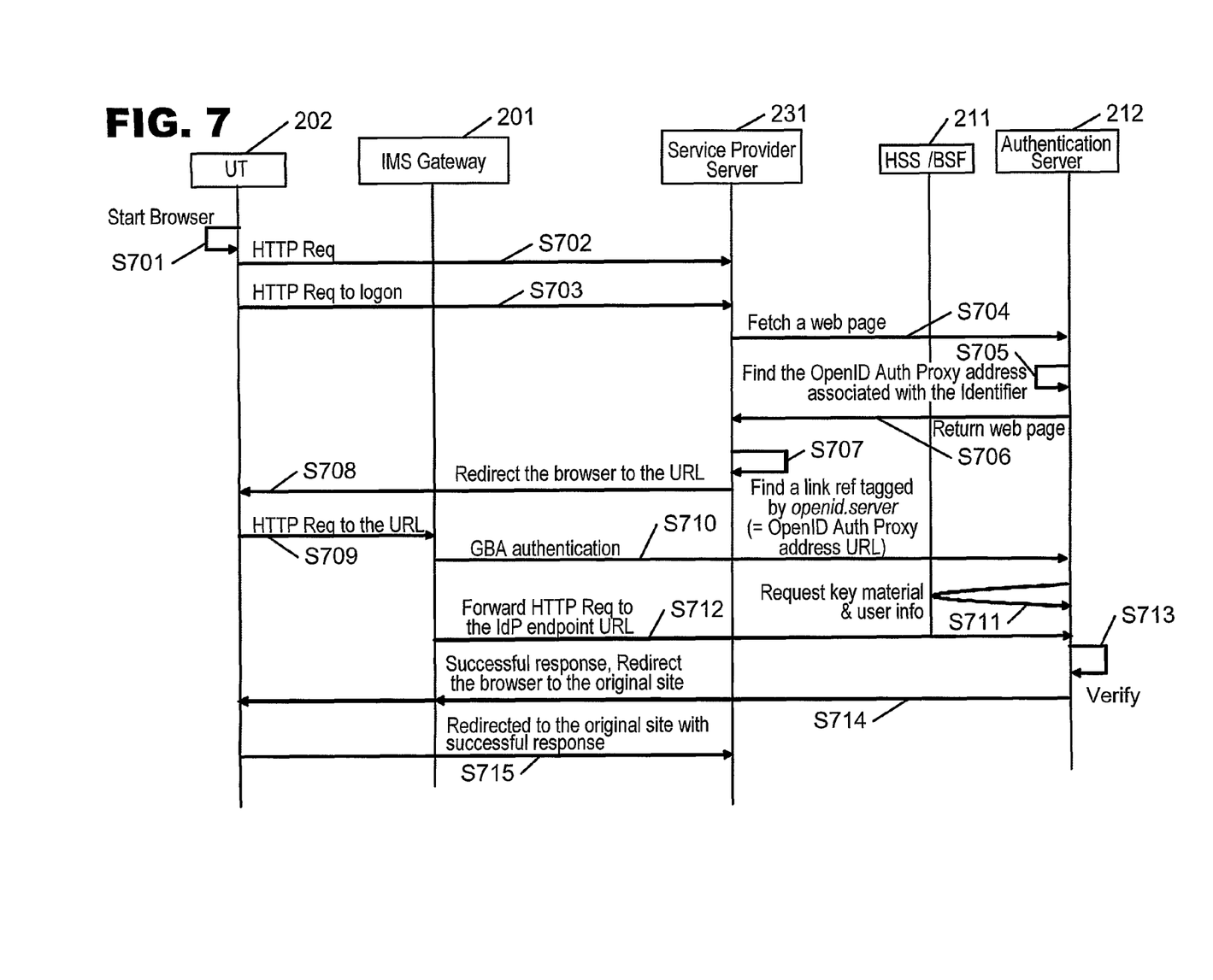
FIG. 7 shows an exemplary sequence diagram describing how a user of the web browser at home is authenticated when accessing an Internet service that allows the OpenID-based authentication, according to one aspect of the present application.

The following steps in FIG. 7 explain how a user of the web browser sitting home is authenticated when accessing an Internet service that allows the OpenID-based authentication.

In step S701, user starts up a web browser in the user terminal 202 by executing the web browser application program 313. In step S702, the user terminal 202 sends a HTTP request addressed to a URL of the service provider server 231 according to a user instruction to the browser for a desired Internet service by clicking a bookmark or entering a URL on the web browser.

The login form appears in response to the HTTP request to the service provider server 231. In step S703, the user enters her/his OpenID Identifier (e.g. http://imsop.net/Smith) and the user terminal sends a HTTP request with the OpenID Identifier to the service provider server 231.

In step S704, the service provider server 231 sends a HTTP GET to fetch a web page according to the OpenID Identifier (http://imsop.net/Smith). In step S705, when the authentication server 212 receives the HTTP GET request, it searches the ID table 323 for the OpenID Authentication Proxy address (http://150.236.132.154.:8080) associated with the received OpenID Identifier. The authentication server 212 sets the found OpenID Authentication Proxy address in a link reference URL tagged by "openid.server" which may be contained in a header part of a web page returned for the HTTP GET. For example, the link reference is prepared as <link rel="openid.server" href="http://150.236.132.154:8080"/>.

In step S706, the web page generated by the authentication server 212 in step S705 is returned to the service provider server 231. In step S707, the service provider server 231 obtains a URL from the link reference tagged by "openid.server". According to the OpenID standard, the tag means an IdP endpoint URL of the authentication server 212, however, in this embodiment, it is assigned to the OpenID Authentication Proxy address of the IMS gateway 201.

In step S708, the service provider server 231 redirects the browser executed in the user terminal 202 to the URL with the claimed OpenID Identifier. In step S709, the user terminal 202 sends a HTTP request to the redirected URL, in this case, to the OpenID Authentication Proxy address. In step S710, the OpenID Authentication Proxy 305 sends a GBA authentication request to authenticate itself. This request may be implemented together with processing in step S712 as HTTP digest authentication or implemented as a part of TLS handshake.

In step S711, the authentication server 212 fetches a GBA key material and user information from HSS/BSF 211 through GBA Zn interface based on the BTID corresponding to the GBA authentication in Ua reference point in step S710. The user information includes the IMPI which is a user identity authenticated through GBA. Using the key material, the GBA NAF 325 in the authentication server 212 authenticates the IMS gateway 201.

In step S712, after the successful GBA authentication, the OpenID Authentication Proxy 305 forwards the redirected HTTP request containing the claimed OpenID Identifier to the authentication server 212. In step S713, the authentication server 212 verifies whether the received OpenID Identifier corresponds to the IMPI fetched in step S711 with reference to the ID table 323 or not. By this verification process, it is possible to verify whether the OpenID Identifier is really owned by the GBA-authenticated user.

In step S714 and S715, if the verification process successfully ends, the authentication server 212 redirects the browser executed in the user terminal 202 (actually through the OpenID Authentication Proxy) with a signed authentication result (i.e. assertion) to the service provider. The service provider server 231 verifies the assertion from the authentication server and finally the user authentication at the service provider server 231 ends in success.

According to the procedure of FIG. 7, the user of the web browser sitting home is authenticated when accessing an Internet service that allows the OpenID-based authentication.

In the embodiment according to FIG. 7, the case where the user uses the user terminal connected to the IMS gateway via the LAN 200 at home, is described. However, there may be a case where the user being outside of the home wishes to be authenticated by the authentication server 212. In such a situation, the OpenID Authentication Proxy 305 registers its global proxy address to the authentication server 212, and the same user authentication mechanism described above is applicable except for that the OpenID Authentication Proxy 305 does not execute the GBA authentication but simply either forwards the HTTP request to the authentication server 212 or redirects the remote browser to the authentication server 212.

The authentication server 212 then authenticates the user (at outside of the home) based on a password associated with the claimed OpenID Identifier. The password is optionally determined by the user if the user desires. This is because it is possible for a malicious party to be successfully authenticated to the authentication server 212 using a stolen OpenID Identifier if the corresponding OpenID Authentication Proxy 305 accepts an authentication request from that malicious party's browser outside home.

To avoid this situation, the OpenID Authentication Proxy 305 determines whether the HTTP request received at the proxy address has been originated from the user in a home network (LAN 200) or the user outside home. If it is from home, the OpenID Authentication Proxy 305 makes it GBA-authenticated toward the authentication server 212. If it is from the outside, the OpenID Authentication Proxy 305 simply forwards or redirects the request to the authentication server 212. The authentication server 212 authenticates the user based on the password.

In the above described embodiment, although it is assumed that the authentication server 212 and the IMS operator is the same entity, the authentication server 212 can be operated by a 3rd party service provider which is trusted by the IMS operator. This is possible because, if the authentication server 212 performs OpenID user authentication through GBA, the authentication server 212 needs to be a GBA NAF and, according to the GBA standard, a NAF can be owned and run by a trusted 3rd party service provider.

The 3rd party provider can retrieve necessary information to maintain the ID table 323 in FIG. 6 from GBA BSF of the IMS operator via GBA Zn interface such as the IMPI 602.

Furthermore, the present invention can be applied to multiple OpenID Identifiers assigned to each member of a household. In the embodiment according to FIG. 7, it is assumed that a single OpenID Identifier is allocated to a household associated with an IMPI of the single IMS gateway 201. However multiple OpenID Identifiers can be allocated to a household when family members want to use a respective OpenID Identifier.

Even in this case, the OpenID Identifiers are associated with the IMPI of the IMS gateway 201 and share a GBA authentication from the IMS gateway 201 toward the authentication server 212 as they share the single IMPI. In this case, identity theft is possible within the family. If this needs to be avoided, the home owner can configure the IMS gateway 201 to perform local family member authentication by using e.g. HTTP basic/digest authentication after the user is redirected to the IMS gateway 201, namely between step S709 and step S710 in FIG. 7. In this case, it is supposed that OpenID Identifiers for the family members are provisioned in the IMS gateway 201 from the authentication server 212 or the IMS operator and the IMS gateway 201 maintains a mapping table between those OpenID Identifiers and local passwords.

According to the several aspects of embodiments of the present invention, it is possible to obtain the following advantages. It should be noted that some embodiments may not achieve some of the following advantages, such embodiments are not excluded from the scope of the present invention.

The present invention provides a mechanism for IMS operators that offer an OpenID authentication service to allow their subscriber to use an OpenID Identifier for Internet services provided by some service provider server, while the IMS operator can authenticate users in the efficient manner based on the ISIM credentials of the IMS gateway which is more secure than password-based authentication. The user does not need to make any setting of the web browsers and does not need to enter a password to be authenticated to the authentication server when the user is at home. Furthermore, no changes are required in the OpenID standard and OpenID Consumer (service provider server) behaviors.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A gateway apparatus configured to communicate with a user terminal and to provide the user terminal with a Generic Bootstrap Architecture (GBA) authentication between the gateway apparatus and an authentication server, the gateway apparatus comprising:
a receiving unit configured to receive from the user terminal an HTTP request addressed to a network address of the gateway apparatus;
a requesting unit configured to send a GBA authentication request to the authentication server, to authenticate the gateway apparatus to the authentication server according to the HTTP request; and
a transmission unit configured to transmit the HTTP request, after GBA authentication, to the authentication server using a network address of the authentication server preliminarily received from the authentication server.

2. The gateway apparatus according to claim 1, wherein
said receiving unit is further configured to receive a global network address for uniquely identifying the gateway apparatus in a network,
said transmission unit is further configured to transmit to the authentication server, via the network, a network address generated using the global network address, and
said receiving unit is further configured to receive the network address of the authentication server from the authentication server as a response to the transmission of the generated network address.

3. The gateway apparatus according to claim 1, wherein said GBA authentication is requested in order to authenticate the gateway apparatus as a subscriber to a network operator.

4. The gateway apparatus according to claim 3, wherein the user terminal is connected to said gateway apparatus via the network, and said requesting unit is configured to send the GBA authentication request unless said receiving unit receives the HTTP request from the user terminal via the network.

5. An authentication server connected to a network and configured to provide a subscriber authentication service for a service provider server, comprising:
a receiving unit configured to receive a web page request that requests a web page designated by a user identifier, said user identifier identifying a user to be authenticated;
an obtaining unit configured to obtain a network address of a gateway apparatus corresponding to said user identifier;
a transmission unit configured to transmit the requested web page, containing the network address of the gateway apparatus, to the service provider server; and
a GBA authentication unit configured to authenticate the gateway apparatus as a subscriber of a network operator relating to the authentication server;
wherein the receiving unit is further configured, after said authentication by said GBA authentication unit, to receive from the gateway apparatus an HTTP request that includes said user identifier,
said authentication server further comprising a verification unit configured to verify whether or not the user identifier received after said authentication corresponds to a gateway identifier assigned to the gateway apparatus.

6. The authentication server according to claim 5, wherein the transmission unit is further configured to transmit a successful response of the verification if the user identifier is successfully verified.

7. The authentication server according to claim 5, further comprising:
a storage unit configured to store a table that associates different user identifiers with different gateway identifiers, and
a retrieving unit configured to retrieve from the table the user identifier corresponding to the gateway identifier that is assigned to the gateway apparatus used in the GBA authentication, wherein the verification unit is configured to verify that the user identifier received after said authentication is the same as the user identifier retrieved from the table.

8. A method implemented by a gateway apparatus configured to communicate with a user terminal for providing the user terminal with GBA authentication between the gateway apparatus and an authentication server, said method comprising:

receiving from the user terminal an HTTP request addressed to a network address of the gateway apparatus;

sending a GBA authentication request to the authentication server, to authenticate the gateway apparatus to the authentication server according to the HTTP request; and transmitting the HTTP request, after GBA authentication, to the authentication server using a network address of the authentication server preliminarily received from the authentication server.

9. The method according to claim 8, further comprising:

receiving a global network address for uniquely identifying the gateway apparatus in a network, transmitting to the authentication server, via the network, a network address generated using the global network address, and receiving the network address of the authentication server from the authentication server as a response to the transmission of the generated network address.

10. The method according to claim 8, wherein said GBA authentication is requested in order to authenticate the gateway apparatus as a subscriber to a network operator.

11. The method according to claim 10, wherein the user terminal is connected to said gateway apparatus via the network, and wherein the method comprises sending the GBA authentication request unless the HTTP request is received from the user terminal via the network.

12. A method implemented by an authentication server connected to an network for providing a subscriber authentication service for a service provider server, said method comprising:

receiving a web page request that requests a web page designated by a user identifier, said user identifier identifying a user to be authenticated;

obtaining a network address of a gateway apparatus corresponding to said user identifier;

transmitting the requested web page, containing the network address of the gateway apparatus, to the service provider server;

GBA authenticating the gateway apparatus as a subscriber of a network operator relating to the authentication server;

after GBA authentication, receiving from the gateway apparatus an HTTP request that includes said user identifier; and verifying whether or not the user identifier received after said authentication corresponds to a gateway identifier assigned to the gateway apparatus.

13. The method according to claim 12, further comprising transmitting a successful response of the verification if the user identifier is successfully verified.

14. The method according to claim 12, further comprising:

storing a table that associates different user identifiers with different gateway identifiers, and retrieving from the table the user identifier corresponding to the gateway identifier that is assigned to the gateway apparatus used in the GBA authentication, wherein said verifying comprises verifying that the user identifier received after said authentication is the same as the user identifier retrieved from the table.

* * * * *